Aug. 30, 1927.

L. SEGUIN ET AL 1,640,966

FLASH PRODUCING APPARATUS

Filed Feb. 23. 1926

Laurent Seguin
Augustin Seguin
INVENTOR;

By
their Attorney.

Aug. 30, 1927.
L. SEGUIN ET AL
1,640,966
FLASH PRODUCING APPARATUS
Filed Feb. 23, 1926
4 Sheets-Sheet 2
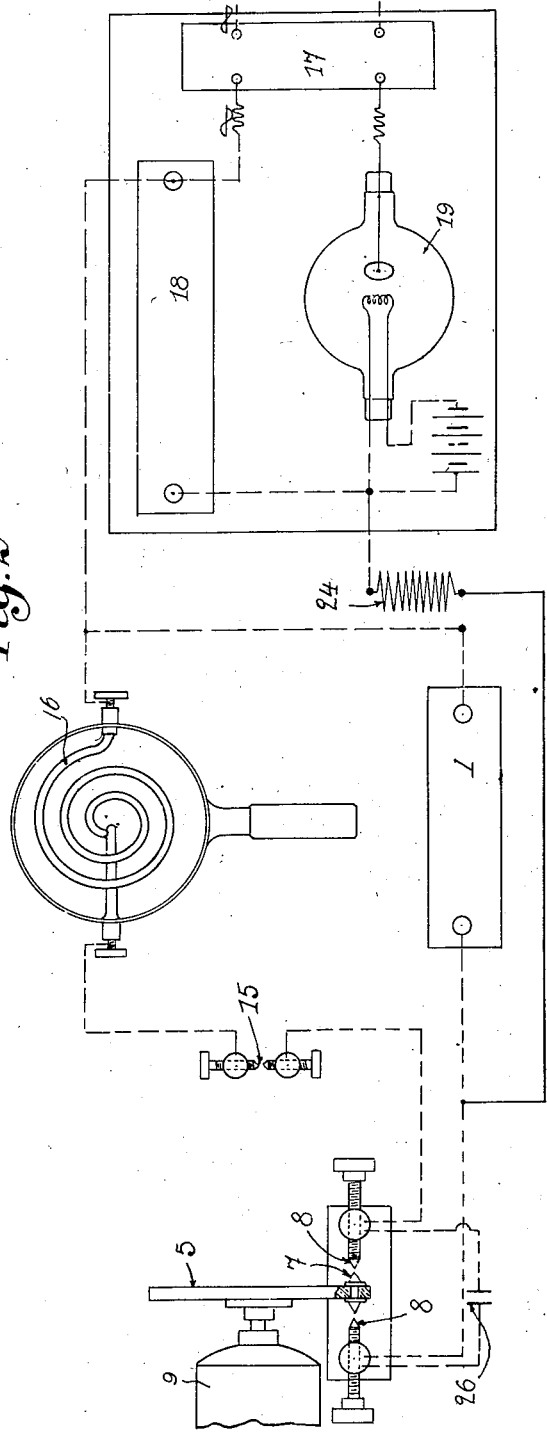
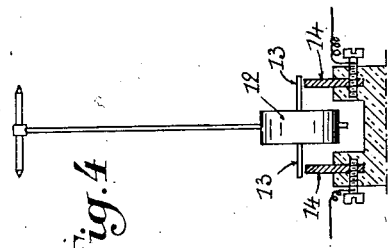
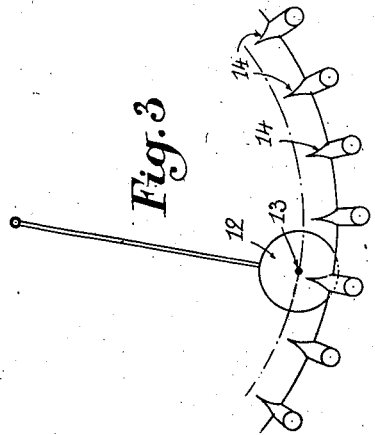
Laurent Seguin
Augustin Seguin
INVENTOR;
by
their Attorney.

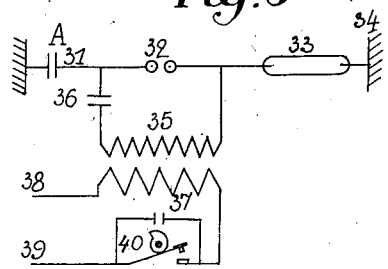
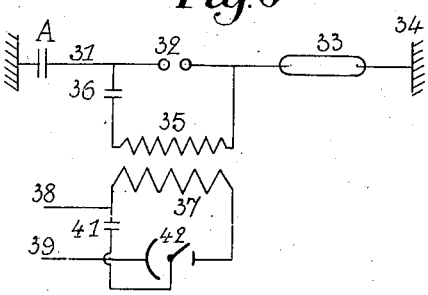
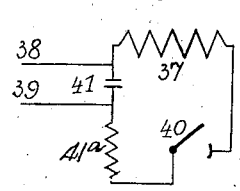
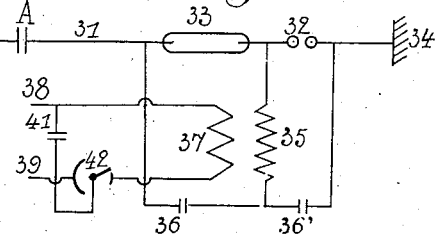
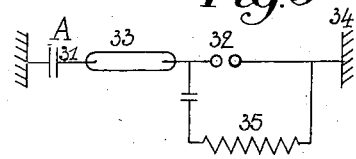
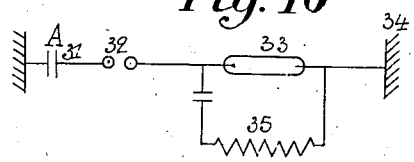
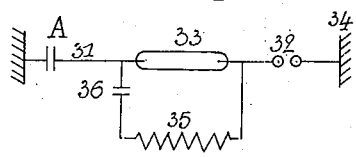
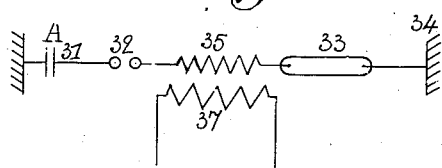
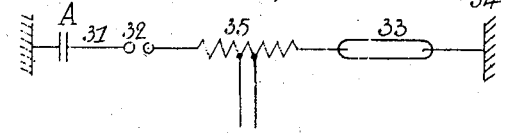
Laurent Seguin
Augustin Seguin
INVENTORS Aug. 30, 1927. 1,640,966
L. SEGUIN ET AL
FLASH PRODUCING APPARATUS
Filed Feb. 23, 1926 4 Sheets-Sheet 4
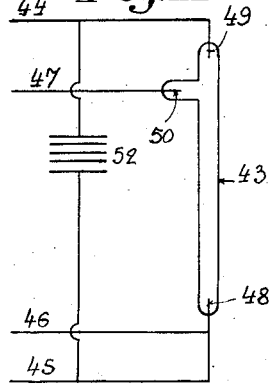
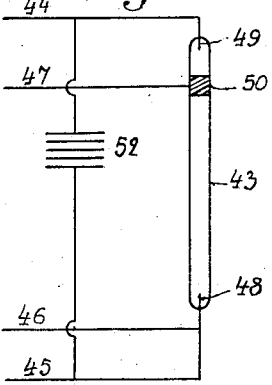
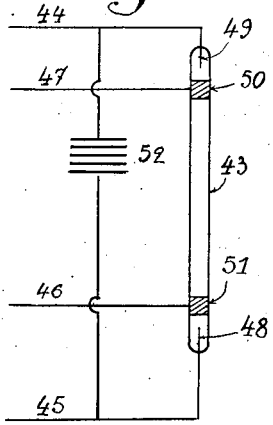
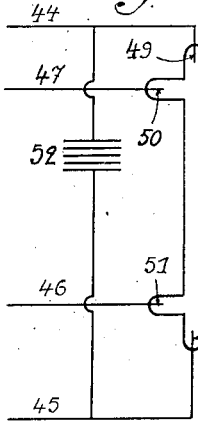
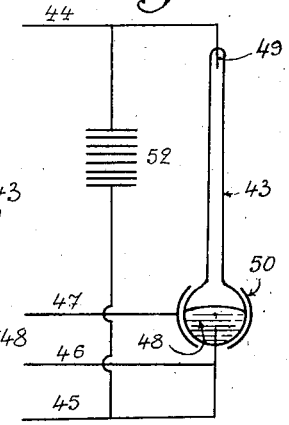
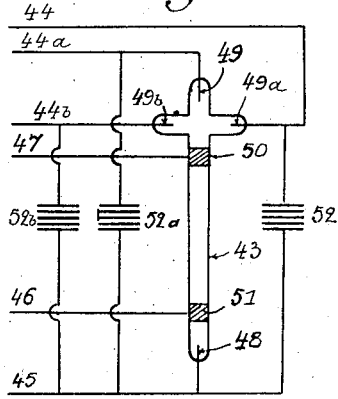
Laurent Seguin
Augustin Seguin
INVENTORS
their Attorney.

Patented Aug. 30, 1927.

1,640,966

UNITED STATES PATENT OFFICE.

LAURENT SEGUIN AND AUGUSTIN SEGUIN, OF PARIS, FRANCE.

FLASH-PRODUCING APPARATUS.

Application filed February 23, 1926, Serial No. 90,067, and in France March 5, 1925.

The present invention relates to a lighting device of the known type in which flashes are produced in tubes containing rarefied gas, or containing vapour, at stated intervals, for instance in order to illuminate an object under examination and to produce the usual stroboscopic effects. An essential feature of this invention resides in that the gas tube is illuminated by means of the discharge of a condenser which is kept constantly charged by a source of electric energy which serves to charge the condenser when necessary, the discharge being independent from the charging operation. In this manner the condenser is always ready to produce a flash.

The time of the occurrence of the flash is regulated by a suitable device, hereinafter referred to as a synchronizer, adapted to close the circuit comprising the said condenser and the gas tube, with or without contact, thus permitting in this latter case to close the circuit without any friction of metallic pieces upon each other. The tension must then be sufficient to produce a spark.

A further important feature of the invention consists in that when the tension is insufficient to allow a spark to be produced, the circuit can be still closed without contacts, by the use of an auxiliary spark which starts the effect in the main circuit by lighting the tube.

The circuits may be so arranged that the current which starts the discharge of the condenser either directly or indirectly will be the only current flowing through the synchronizer, the lighting current, in such case, being not obliged to flow through the same. The synchronizer is then mounted in an auxiliary circuit comprising a source of current of small energy this circuit being connected directly or indirectly to the terminals of the spark valve or to the terminals of the gas tube itself, or to one or more auxiliary electrodes for the purpose of starting the discharge of the condenser.

In the appended drawings and by way of example:

Fig. 2 is an analogous device employing alternating current from a transformer.

Figs. 3 and 4 are respectively a plan view and a section of a synchronizer embodying a pendulum.

Figs. 5 to 13 shows diagrammatically various practical arrangements wherein the synchronizing circuit is connected in shunt upon the main circuit, in order to start the discharge of the condenser.

Figs. 14 to 19 illustrate diagrammatically arrangements wherein the said auxiliary circuit is connected to the main circuit by means of additional electrodes provided upon the tube.

Figure 1:
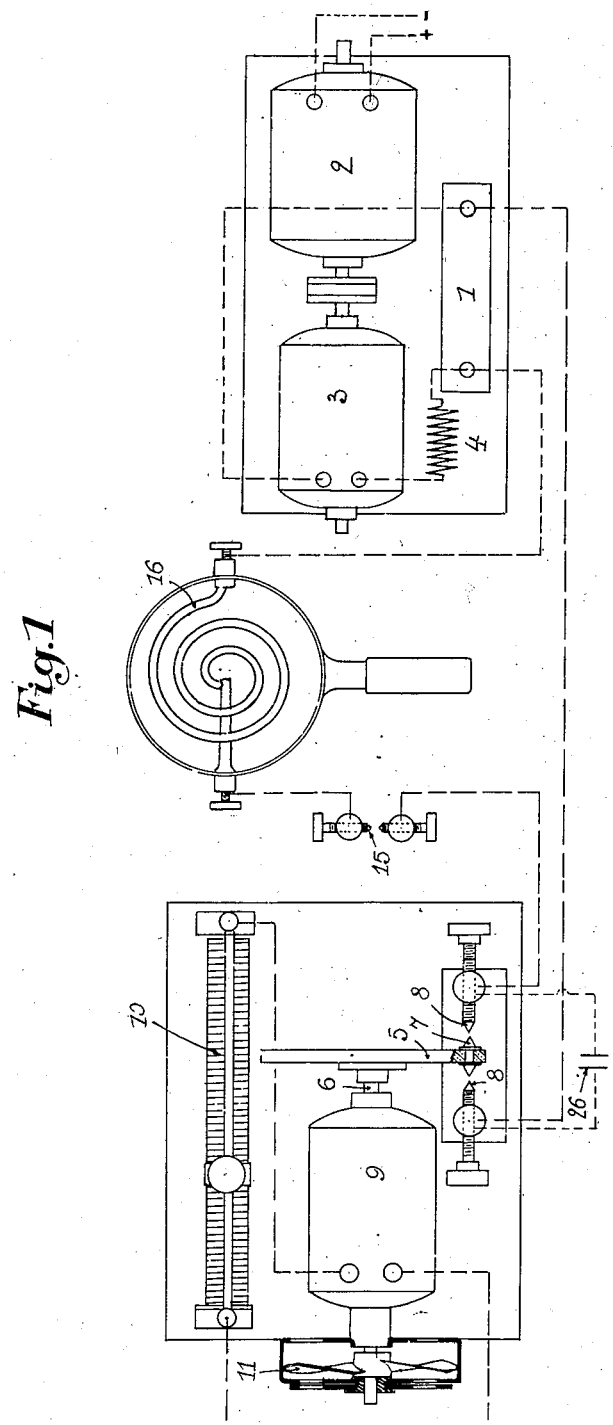
Fig. 1 shows in a diagrammatic manner a device according to the invention which utilizes continuous current from a generator.

The device shown in Fig. 1 comprises the following parts:

The condenser 1 and its charging group which chiefly comprises an electric motor 2 and a high tension continuous current generator 3 whose terminals are connected to those of a condenser 1 through the medium of a resistance 4 or an inductive resistance, or the two combined, or in any other manner which will avoid short-circuiting the generator when the flash occurs.

A disc 5 is mounted upon a shaft 6 and carries one or more insulated metallic contact pieces 7 affording any desired number of flashes per revolution; these contact pieces serve to close the circuit of the condenser 1 through the medium of two sparks of adjustable length which are formed between the piece 7 and the two adjustable sparking points 8; by the adjustment of the latter we are enabled to make the proper selection of the oscillating discharge of the condenser and to exactly locate the flashing point.

In certain cases, the adjustment may be carried out in such manner that the circuit will be closed by the actual contact of the metallic pieces.

The disc 5 is actuated by a motor 9, preferably an electric motor, and this may in general have a very small power, since its motion is not affected by any contact or friction.

The said disc may constitute a flywheel which will suffice to obtain a uniform motion serving as a term of comparison in the case in which the irregularities in the motion of the object under examination are to be put in evidence; but it may also be made as light as desired, so as to be able to be subjected to a movement having a determined law, should this prove necessary.

We may add to the motor a brake and a rheostat 10 so as to synchronize its speed with that of the object under examination. The said brake may consist of an air fan 11 mounted on the motor shaft, the air inlet and outlet being more or less closed, which in certain cases, will afford an accurate adjustment.

In another arrangement, which in some cases is better adapted for the desired observations, the disc 5 may be replaced by a pendulum 12 (Figs. 3 and 4) provided with two contacts 13 which close the circuit when moving over a set of conducting points 14, or by a like element having a suitable movement and adapted to provide for the flashes.

The arrangement shown in Fig. 1 is completed by a spark valve 15 and a tube containing a rarefied gas 16 in which a flash is produced each time the circuit is closed; the spark valve and the lamp are connected in series in the circuit of the condenser 1 and the points 7 and 8. Each time the piece 7 passes between two points 8, the condenser discharges into the circuit: 1, points 7 and 8, 15, 16, illuminating the tube 16. The adjustable spark valve 15 serves for effecting an optimum selection of the oscillating discharge of the condenser so as to provide for a single flash for each discharge.

It should be noted that by the use of this device we are enabled to utilize currents having a high intensity, since the circuit may be closed without contacts or friction, and the parts between which the sparks are produced will be hardly deteriorated. Our said device is thus well adapted for the illumination of a whole room or of a stroboscopic scene, and the observations can be made under conditions of convenience and illumination which are most advantageous; the said device is further adapted for demonstrations before an audience.

For the source of high tension, instead of employing a continuous current generator having a constant tension at the terminals, we may utilize an alternating current transformer which transforms the usual low tension current into high tension alternating current which is then rectified by known means, such as: kenotrons, mercury vapor tubes, electrolytic valves, rotary converters, etc.

The above arrangement may be modified as shown in Fig. 2 by employing an auxiliary condenser forming a reservoir of energy relatively to the lighting condenser in the case in which the current is irregular. In said figure, the same reference numerals serve to designate similar parts as those illustrated in Fig. 1.

As in the preceding case, the installation comprises a gas tube 16, a lighting condenser 1 and a synchronizer 5, rotated at a uniform speed by a motor 9 regulated in the same manner as before. When the insulated part 7 passes in front of the sparking points 8 it closes the circuit of discharge of the condenser 1 into tube 16, by means of two sparks of adjustable length. The installation is completed by an auxiliary condenser 18 serving as a reservoir of energy whose capacity is much greater than that of condenser 1; said auxiliary condenser kept constantly charged by any suitable means, for instance by the current from an alternating current transformer 17 which is rectified by a kenotron 19.

The condenser 18 serves to charge the lighting condenser 1 between each flash, through the medium of a noninductive resistance 24 which prevents the main condenser 18 from discharging through the tube 16 at the same time as the condenser 1.

The said arrangement has the following advantages. If between two closely adjacent flashes of the gas tube, the undulating current from the kenotron has not had the time to pass through a maximum, the condenser 18, were it used alone, would be entirely discharged by the first flash, and would not have time to be charged for the next flash. But with our said arrangement, the flash discharges the small condenser 1, and the main condenser will act relatively to the small condenser as an accumulator of energy and will provide a practically constant reserve, since only a small part of this reserve is withdrawn for lighting purposes.

Should the tension at the terminals of the condenser be too low to form a spark between the points 7 and 8, a source 26 (Fig. 1) of high tension but of very small intensity may be directly connected to the terminals of the spark valve. The auxiliary spark produced by this device will start the discharge of the condenser.

Figs. 5 to 13 show diagrams in which the current used for starting the discharge of the condenser is the only one passing through the synchronizer, the lighting of the tube being thus obtained.

In this event the reservoir of energy formed by the condenser is kept constantly charged by an independent source, and supplies the said tube through the medium of a circuit in which the tension of the current is such that the latter will be insufficient to provide for the illumination of the tube, due to the resistance of the said tube, spark valves and the like, mounted in the circuit. The illumination of the tube is effected by a starting effect which is due to an auxiliary circuit which is shunted upon the first-mentioned circuit and is supplied by the synchronizer which provides for the passage in this auxiliary circuit of a current of small energy but of high tension.

In Figs. 5 to 13, the main lighting circuit comprises a condenser A which is supplied by an independent source, not shown, such as the one above mentioned in which one pole is grounded and the other is connected to the point 31 of this circuit.

In the arrangement shown in Fig. 5, the lighting circuit connects the tension pole 31 with the spark valve 32, the tube 33 and earth 34.

The spark valve 32 is shunted by an auxiliary circuit comprising the secondary coil 35 of a transformer and a condenser 36. The primary coil 37 of said transformer is inserted in a circuit which is itself supplied at 38 and 39 by an independent source, not shown. The said circuit further comprises a circuit breaker 40 which is mechanically operated at an adjustable speed and serves as a synchronizer.

At each break of the auxiliary circuit, the high tension current which is produced in the secondary coil will ionize the tube, illuminating it slightly, and will afford the passage of the main current which illuminates it in the normal manner.

In the device shown in Fig. 6, the lighting circuit is the same, as also the shunt circuit of the spark valve, but the primary coil 37 of the transformer is supplied by a condenser 41. A rotary contact device 42 which is mechanically operated at an adjustable speed, and which serves as a synchronizer, connects the condenser 41 at certain times with a charging source, and at other times with the primary coil 37 into which it instantaneously discharges, producing in the secondary coil 35 a current which ionizes the tube as above mentioned. The transformer may be such that this current will have a high frequency.

One advantage obtained by this latter arrangement consists in the fact that it operates by contact and not by break, as in the preceding case, and due to the absence of arcs at the breaking point, the time of the illumination can be more closely determined.

Fig. 7 shows a modification of the said device in which the condenser 41 is constantly charged at its terminals 38 and 39. A resistance 41$^a$ prevents all short-circuits between 38 and 39 at the time of contact at 40.

In the arrangement shown in Fig. 8, the lighting circuit connects the tension pole 31 to the tube 33, as well as to the spark valve 32 and the earth 34. The tube 33 is shunted by a circuit comprising the secondary coil 35 and the condenser 36. The spark valve 32 is shunted by a circuit which comprises the same secondary coil 35 and the condenser 36'. The primary coil 37 is supplied by any one of the devices shown in Figs. 5 to 7, for example by the contact device 42 and the condenser 41.

Figs. 9, 10 and 11, in which only the lighting circuit is represented, show the different positions which may be occupied in this circuit by the tube 33 and the spark valve 32, and these may be completed by either of the devices hereinbefore described.

Figs. 12 and 13 refer to the case in which the secondary coil of the transformer is mounted in the lighting circuit. In the case of Fig. 12, the primary coil 37 may be mounted according to either of the above mentioned arrangements, and in Fig. 13, the primary coil 37 consists of a few convolutions of the secondary coil itself, thus forming an auto-transformer.

It is obvious that in Figs. 12 and 13 the relative positions of the spark valve 32, the tube 33 and the secondary coil 35 may be reversed.

The starting circuit may also be connected to the main circuit directly with the gas or vapour lamp, which comprises for this purpose one or more additional electrodes which are mounted in the circuit controlled by the synchronizer serving to determine the desired frequency of the starting current.

In this manner we are enabled to eliminate the spark valve in the lighting circuit of the lamp, while providing for the regular starting of the lighting condenser discharge. We obtain other advantages by dispensing with the said spark valve since the noise of the spark can be eliminated and we are enabled to use a source of lighting energy of lower tension, and in these conditions the use of mercury vapour lamps is much facilitated.

Figs. 14 to 19 show by way of example six arrangements of circuits based on this latter principle.

The current of the source of lighting energy (Figs. 14, 15, 16 and 17) is supplied directly to the lighting electrodes 48 and 49 of the gas tube 43, by the wires 44 and 45, or by more than two wires, chiefly where the current is of the polyphase type and the lamp has more than two lighting electrodes. The starting current is supplied by the wires 46 and 47 ending at the two additional starting electrodes 50 and 51, the said current being distributed by a suitable synchronizer. The latter electrodes may be independent of one another, as shown in Figs. 16 and 17, or one of them may consist of one of the lighting electrodes, for instance the electrode 48, as shown in Figs. 14 and 15. The said starting electrodes may be internal electrodes (Fig. 14), or otherwise one or both of the starting electrodes may consist of an armature disposed at the exterior of the lamp, adjacent or even at some distance from the periphery of the lamp tube, or may consist of a sheet metal member surrounding the said tube and forming the outer coating of a condenser (Figs. 15 and 16). In practice, the lamp reflector may constitute this electrode.

We employ a condenser 52 which stores up the electric energy between the lighting periods of the lamp and produces instantaneous flashes at the time of starting; said condenser is shunted upon the lighting electrodes 48 and 49. By reason of the drop in tension which it produces in the line immediately after its discharge, the said condenser also serves to prevent the lamp from remaining lighted by the current of the line, and chiefly in the case of lamps such as mercury vapour lamps which remain lighted after they have been started.

As shown in Fig. 18, we may thus employ mercury vapour lamps for the lighting. The illumination of the tube 43 is started by means of one of the electrodes 48 and the coating 50 of the usual condenser serving to light the lamp; said electrodes are mounted in the circuit 46—47 of the synchronizer. The lighting condenser 52 may be an electrolytic condenser having a large capacity in the case of low tension lighting currents.

In the case in which polyphase currents are employed, for example three-phase currents (Fig. 19), a lamp having four lighting electrodes 48, 49, 49ª, 49ᵇ is used, and condensers 52, 52ª, 52ᵇ are disposed between each lighting electrode and the electrode 48 connected to the neutral wire 45 of the three-phase system.

In addition to their use for stroboscopic purposes, the apparatus according to the invention may serve as ordinary lighting apparatus of the gas tube type, such as those employed for luminous advertisements, utilizing in this case very high frequencies for the starting current. This permits to use a source of lighting energy the tension whereof is much below the tension required for the direct illumination of the tube. By means of the said apparatus, we can obtain a powerful illumination for naval and aerial electric projectors or like apparatus, the source of light consisting of gas tubes supplied by the discharges of a condenser which are regulated at the desired periods of time by the devices hereinbefore set forth.

Obviously, this invention is not limited to any particular construction of the said apparatus, the several constructions above described and illustrated being given solely by way of example.

Having now described our invention, what we claim as new and desire to secure by Letters Patent is:

1. Flash producing apparatus comprising a luminescent silent discharge tube, a condenser, means for charging said condenser in a continuous manner, a noninductive circuit connecting said condenser to said silent discharge tube and means adapted to close directly said circuit in an intermittent manner and independently of the charging operation for said condenser, for producing instantaneous discharges in said tube.

2. Flash producing apparatus comprising a silent discharge tube, a condenser, means for charging said condenser in a continuous manner, means including an adjustable spark valve for connecting said condenser to said silent discharge tube and electrically conducting means adapted to be moved between the terminals of said spark valve for producing instantaneous discharges of said condenser into said tube in an intermittent manner and independently of the charging operation for said condenser.

3. Flash producing apparatus comprising a silent discharge tube, a condenser, alternating current generating means, means for rectifying the current thus produced, means for connecting said rectifier with said condenser for charging the same and means whereby said condenser is connected to said silent discharge tube in an intermittent manner and independently of the charging operation for said condenser for producing instantaneous discharges in said tube.

4. Flash producing apparatus comprising a silent discharge tube, a main condenser of relatively great capacity, a lighting condenser of smaller capacity, means for charging said main condenser, means for connecting said two condensers with one another and whereby said main condenser is adapted to charge said lighting condenser in a continuous manner and means whereby said lighting condenser is connected to said silent discharge tube in an intermittent manner for producing instantaneous discharges in said tube.

5. Flash producing apparatus comprising a silent discharge tube, a condenser of relatively low tension, means for charging said condenser in a continuous manner, a circuit connecting said condenser to said silent discharge tube, and means for generating currents having a high tension and a very small intensity, in an intermittent manner and independently of the charging operation for said condenser, said currents being adapted to start the discharges of said condenser through said circuit for producing instantaneous flashes in said tube.

6. Flash producing apparatus comprising a silent discharge tube, a condenser of relatively low tension, means for charging said condenser in a continuous manner, a main circuit connecting said condenser to said silent discharge tube, and an auxiliary circuit mounted in parallel with said main circuit and comprising means for generating an intermittent current having a high tension, a very small intensity and a frequency which is independent from the charging operation for said condenser, and whereby the discharges of said condenser through said circuit are started.

7. Flash producing apparatus comprising a silent discharge tube, a condenser of relatively low tension, means for charging said condenser in a continuous manner, a main circuit connecting said condenser to said silent discharge tube, and an auxiliary circuit mounted in parallel with said main circuit and comprising means for generating a current having a high tension and a very small intensity and adapted to start the discharges of said condenser through said main circuit, a synchronizer for controlling the passage of said current through said auxiliary circuit and means for driving said synchronizer independently from the charging operation of said condenser.

8. Flash producing apparatus comprising a silent discharge tube, a main condenser of relatively low tension, means for charging said condenser in a continuous manner, a main circuit connecting said condenser to said silent discharge tube, a transformer the high tension coil whereof is mounted in parallel with said main circuit, an auxiliary condenser connected to the low tension coil of said transformer, means for charging said auxiliary condenser in a continuous manner, a synchronizer adapted to control the discharges of said auxiliary condenser through said low tension coil and means for driving said synchronizer independently of the charging operation of said main condenser.

9. Flash producing apparatus comprising a silent discharge tube, means for supplying a relatively low tension current to the electrodes of said tube, said means comprising a condenser shunted upon said electrodes, a number of auxiliary electrodes for said tube and an auxiliary circuit connected with said auxiliary electrodes and comprising means for generating an intermittent current having a high tension, a very small intensity and of the desired frequency and whereby the discharges of said condenser through said circuit are started.

10. Flash producing apparatus comprising a silent discharge tube, a condenser of relatively low tension, means for charging said condenser in a continuous manner, a main circuit connecting said condenser to the electrodes of said silent discharge tube, a number of auxiliary electrodes for said tube and an auxiliary circuit connected with said auxiliary electrodes and comprising means for generating an intermittent current having a high tension, a very small intensity and a frequency which is independent from the charging operation for said condenser and whereby the discharges of said condenser through said circuit are started.

11. Flash producing apparatus comprising a silent discharge tube, a condenser of relatively low tension, means for charging said condenser in a continuous manner, a main circuit connecting said condenser to the electrodes of said silent discharge tube, a number of auxiliary electrodes for said tube, one of which at least is situated outside said tube, and an auxiliary circuit connected with said auxiliary electrodes and comprising means for generating an intermittent current having a high tension, a very small intensity and a frequency which is independent from the charging operation for said condenser and whereby the discharges of said condenser through said circuit are started.

12. In combination with a mercury vapour discharge tube: a lighting condenser of relatively low tension, means for charging said lighting condenser in a continuous manner, a main circuit connecting said lighting condenser to the electrodes of said discharge tube, an auxiliary circuit connecting one electrode of said tube with the outer coating of the condenser of said tube surrounding the same and means for generating in said auxiliary circuit an intermittent current having a high tension, a very small intensity and a frequency which is independent from the charging operation for said condenser and whereby the discharges of said condenser through said circuit are started.

13. Flash producing apparatus comprising a silent discharge tube, a condenser of relatively low tension, means for charging said condenser in a continuous manner, a main circuit connecting said condenser to the electrodes of said silent discharge tube, a reflector for said discharge tube and an auxiliary circuit comprising said reflector and further comprising means for generating an intermittent current having a high tension, a very small intensity and a frequency which is independent from the charging operation for said condenser and whereby the discharges of said condenser through said circuit are started.

In testimony whereof we have signed our names to this specification.

LAURENT SEGUIN.
AUGUSTIN SEGUIN.